(12) United States Patent
Johnson et al.

(10) Patent No.: US 8,018,958 B1
(45) Date of Patent: Sep. 13, 2011

(54) SYSTEM AND METHOD FOR FAIR SHARED DE-QUEUE AND DROP ARBITRATION IN A BUFFER

(75) Inventors: John Delmer Johnson, Los Altos, CA (US); Abhijit Ghosh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 246 days.

(21) Appl. No.: 12/489,947

(22) Filed: Jun. 23, 2009

(51) Int. Cl.
 *H04L 12/28* (2006.01)
(52) U.S. Cl. .................. 370/401; 370/415; 370/413
(58) Field of Classification Search ............... None
 See application file for complete search history.

(56) References Cited

U.S. PATENT DOCUMENTS

| | | | | |
|---|---|---|---|---|
| 6,804,241 | B2 * | 10/2004 | Schwartz et al. | 370/392 |
| 2003/0179703 | A1 * | 9/2003 | Levy et al. | 370/230 |
| 2007/0121630 | A1 * | 5/2007 | Stephen et al. | 370/390 |
| 2009/0279560 | A1 * | 11/2009 | Jones et al. | 370/413 |

OTHER PUBLICATIONS

Cidon, Israel; Georgiadis, Leonidas; Guerin, Roch and Khamisy, Asad, "Optimal Buffer Sharing".
Choudhery, Abhijit K. and Hahne, Ellen L., "Dynamic Queue Length Thresholds for Shared-Memory Packet Switches".

\* cited by examiner

*Primary Examiner* — Duc C Ho
(74) *Attorney, Agent, or Firm* — Harrity & Harrity, LLP

(57) ABSTRACT

Systems and methods consistent with the present invention provide a mechanism that can efficiently manage multiple queues and maintain fairness among ports while not placing additional performance demands on the memory used to store the queue data structures. Within a port, high priority traffic is dropped only if it is consuming more than its fair share of bandwidth allocated to that port. Queue arbitration is of low performance cost and simple because it arbitrates only across queues per port, rather than across all the queues in parallel. Accordingly, fair arbitration with relatively little hardware cost.

17 Claims, 4 Drawing Sheets

SYSTEM AND METHOD FOR FAIR SHARED DE-QUEUE AND DROP ARBITRATION IN A BUFFER

CROSS REFERENCE TO RELATED APPLICATIONS

The present application is related to U.S. patent application Ser. No. 12/473,408, entitled SYSTEM AND METHOD FOR SHARED BUFFER MANAGEMENT, filed on May 28, 2009, assigned to a common assignee, and the entirety of which is herein incorporated by reference.

FIELD OF THE INVENTION

The present invention generally relates to buffer management in a router, and relates more particularly to de-queue/drop arbitration for sharing buffer space.

BACKGROUND OF THE INVENTION

Network packet routers use buffer management techniques to share limited buffer space between various incoming data ports and classes of data packets. Typically, the packets are divided into cells that are managed by a set of queues. Packets from multiple ports are en-queued to multiple queues based on their classified priority and de-queued based on available bandwidth of the shared output port(s). Often the available output bandwidth is less than in aggregate input bandwidth and packets must be dropped because there is limited shared buffer memory. If there is efficient buffer management of the shared buffer memory, overall loss performance, as well as fairness between ports, can be improved. However, there are many restrictions on implementing a buffer management scheme. The hardware implementing the management must operate at the rate of the incoming packets, and this rate approaches the maximum rate that can be realized using current memory technology.

Routers use buffer allocation techniques to share limited buffer space between various incoming data ports and classes of data packets. Packets from multiple ports are en-queued to multiple queues based on their classified priority and de-queued based on available bandwidth of the shared output port(s). Under varying traffic conditions, it is desirable to allocate more buffer space to some ports if the buffer space is not needed by other ports. This situation may occur because there is low traffic on the other ports. However, when these low traffic ports face higher traffic, the ports that where using extra buffers should be the first to have their traffic dropped in order to be fair. Also, packets from the ports have different priorities, and thus dropping decision must take these priorities into account when determining which packets to drop. Accordingly, a fair method of arbitration is needed to determine which packets should be dropped while realizing the inherent hardware limitations of high-speed routers.

BRIEF SUMMARY OF THE INVENTION

A method for packet drop arbitration in a data processing system is disclosed in accordance with one embodiment of the present disclosure. The method comprises determining an input port from the plurality of input ports for which a packet should be dropped, determining a queue from which to drop the packet from a plurality of queues in the memory that are associated with the input port, and dropping the packet from the determined queue.

A data processing system is disclosed in accordance with an alternative embodiment of the present disclosure. The data processing system comprises a router having a memory, at least one output port, and a plurality of input puts, a plurality of queues stored in the memory, wherein there are at least two queues associated with each of the plurality of input ports, and a queue arbiter for de-queuing a packet from one of the plurality of queues to the output port, wherein the first level of arbitration is based on a selection of an input port and the second level of arbitration is based on priority of the at least two queues associated with the input port.

In yet another embodiment, a computer program product comprising computer-implemented instructions for performing a method of packet de-queue arbitration is disclosed in the present disclosure. The method includes determining an input port from the plurality of input ports for which a packet should be de-queued, determining a queue from which to de-queue the packet from a plurality of queues in the memory that are associated with the input port, and de-queuing the packet from the determined queue.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF THE SEVERAL VIEWS OF THE DRAWING

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION OF THE INVENTION

Methods and systems consistent with the present invention provide a simple, low-cost method of sharing a buffer by a two-level arbitration scheme to ensure that each port in the router has fair access to output bandwidth, while maintaining priority-based de-queue and drop criteria on a per-port basis. Moreover, different de-queue and drop priorities allow a buffer manager to maintain fairness, but still allow some queues to use more than their fair share of the buffer when traffic conditions allow. Fairness of de-queue between ports is achieved by implementing a weighted round-robin arbitrator amongst the ports. If any of the p priority queues associated with a port is ready to forward its cells, then this port participates in this cycle of round-robin arbitration. Once a port has been selected by the weighted round-robin arbitration then second level strict priority arbitration amongst the p priority queues for this port is preformed. Bandwidth allocation is fair between ports because the weighted round-robin arbitration does not depend on the amount of buffer space being used. Thus, all ports will receive their weighted fair share of the output bandwidth. This scheme is simple to execute in hardware because the complex round-robin arbitration is across only n ports, not across the n*p queues.

Reference will now be made in detail to an implementation consistent with the present invention as illustrated in the accompanying drawings.

Figure 1:
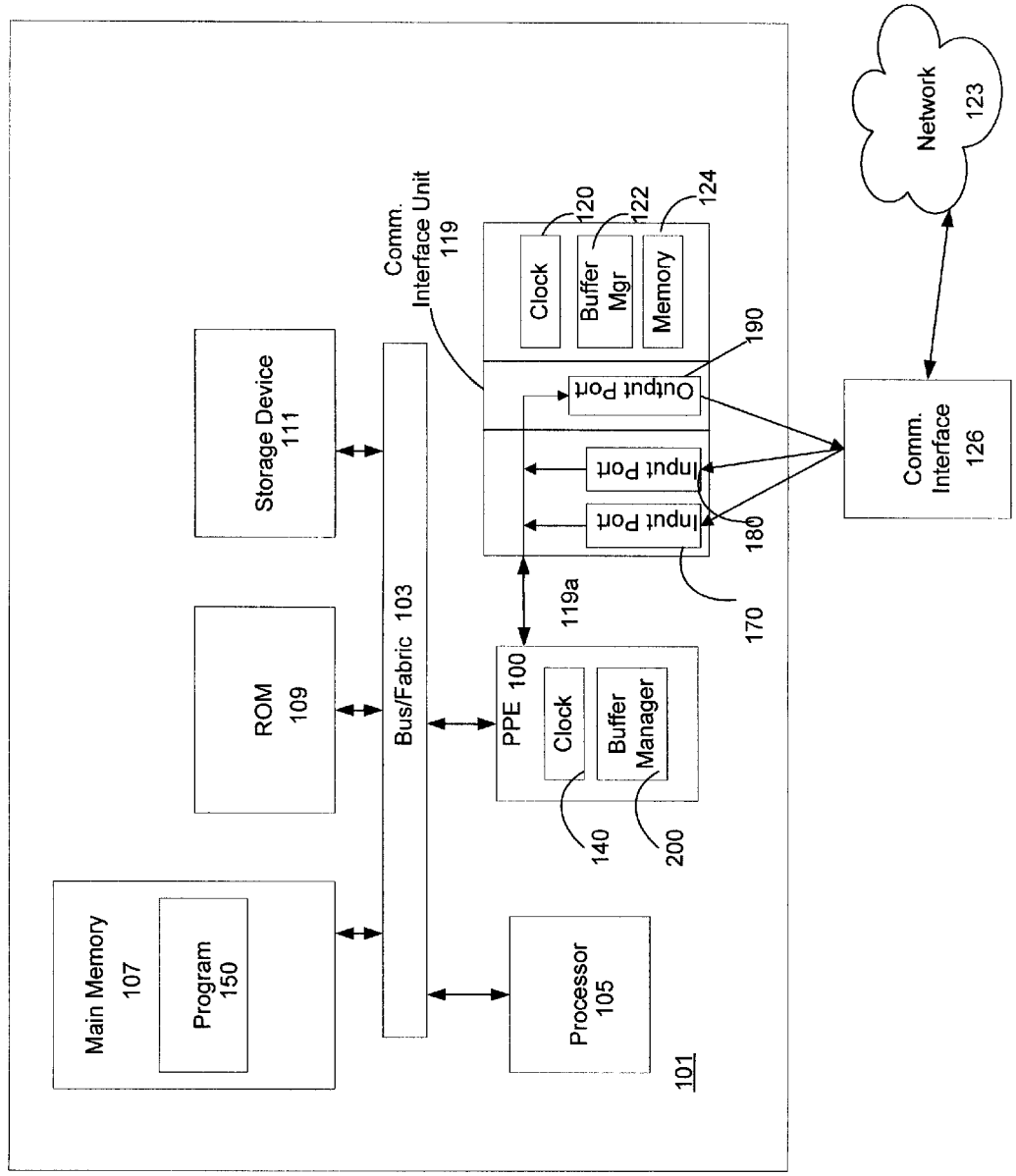
FIG. 1 illustrates an exemplary router in which methods and systems consistent with the present invention may be implemented.

FIG. 1 illustrates an exemplary router 101 consistent with systems and methods consistent with the present invention. Router 101 includes a bus 103 or a fabric for communicating information, and a processor 105 coupled with bus or fabric 103 for processing the information. Router 101 also includes a main memory 107, such as a random access memory (RAM) or other dynamic storage device, coupled to bus or fabric 103 for storing information and instructions to be executed by processor 105. In addition, main memory 107 may be used for storing temporary variables or other intermediate information during execution of instructions to be executed by processor 105. Main memory 107 includes a program 150 for implementing queue management consistent with methods and systems consistent with the present invention, described below. Router 101 further includes a read only memory (ROM) 109 or other static storage device coupled to bus or fabric 103 for storing static information and instructions for processor 105. A storage device 111, such as a magnetic disk or optical disk, is provided and coupled to bus or fabric 103 for storing information and instructions.

According to one embodiment, processor 105 executes one or more sequences of one or more instructions contained in main memory 107. Such instructions may be read into main memory 107 from another computer-readable medium, such as storage device 111. Execution of the sequences of instructions in main memory 107 causes processor 105 to perform the process steps described herein. One or more processors in a multi-processing arrangement may also be employed to execute the sequences of instructions contained in main memory 107. In alternative embodiments, hard-wired circuitry may be used in place of or in combination with software instructions. Thus, embodiments are not limited to any specific combination of hardware circuitry and software.

Although described relative to main memory 107 and storage device 111, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Router 101 includes at least one packet processing engine (PPE) 100 to process packet headers and determine the next hop of the packet. In order to store and manage the packets during processing, PPE 100 includes a buffer manager 200 and a processor clock 140. Router 101 also includes a communication interface unit 119 connected to the PPE 100 via a limited bandwidth (BW) port 119a. Communication interface unit 119 provides a two-way data communication via an external communication interface 126 that is connected to a network 123. In this embodiment, the communication interface unit 119 is electronically coupled to the packet process engine (PPE) 100 via the limited BW port 119a. In an alternative embodiment, the communication interface unit 119 may be integrated as part of the PPE 100 for communication with external communication interface 126.

The communication interface unit 119 includes input ports 170 and 180, as well as an output port 190. One of ordinary skill in the art will recognize that more input and output ports may be included within the communication interface unit 119 without departing from the spirit and scope of the present disclosure. The communication interface unit 119 also includes internal components for managing bandwidth, including a clock 120, a buffer manager 122, and a memory 124. In an exemplary implementation, communication interface unit 119 receives digital data streams representing various types of information from the external communication interface 126 via the input ports 170 and 180. Communication interface unit 119 also sends digital data streams to the external communication interface 126 via output port 190.

The bandwidth of digital data received from the external communication interface 126 is often higher than the bandwidth that the bus or fabric 103 of router 101 may handle. The communication interface unit 119 of present disclosure therefore provides a buffer manager 122 that manages bandwidth of the external communication interface 126 when receiving digital data. The buffer manager 122 performs both an en-queue operation and the combined de-queue head-drop operation, such that the bandwidth of digital data at the limited BW port 119a is lower than the bandwidth of digital data received at the input ports 170 and 180 even if the bandwidth is received at a peak rate.

Figure 2:
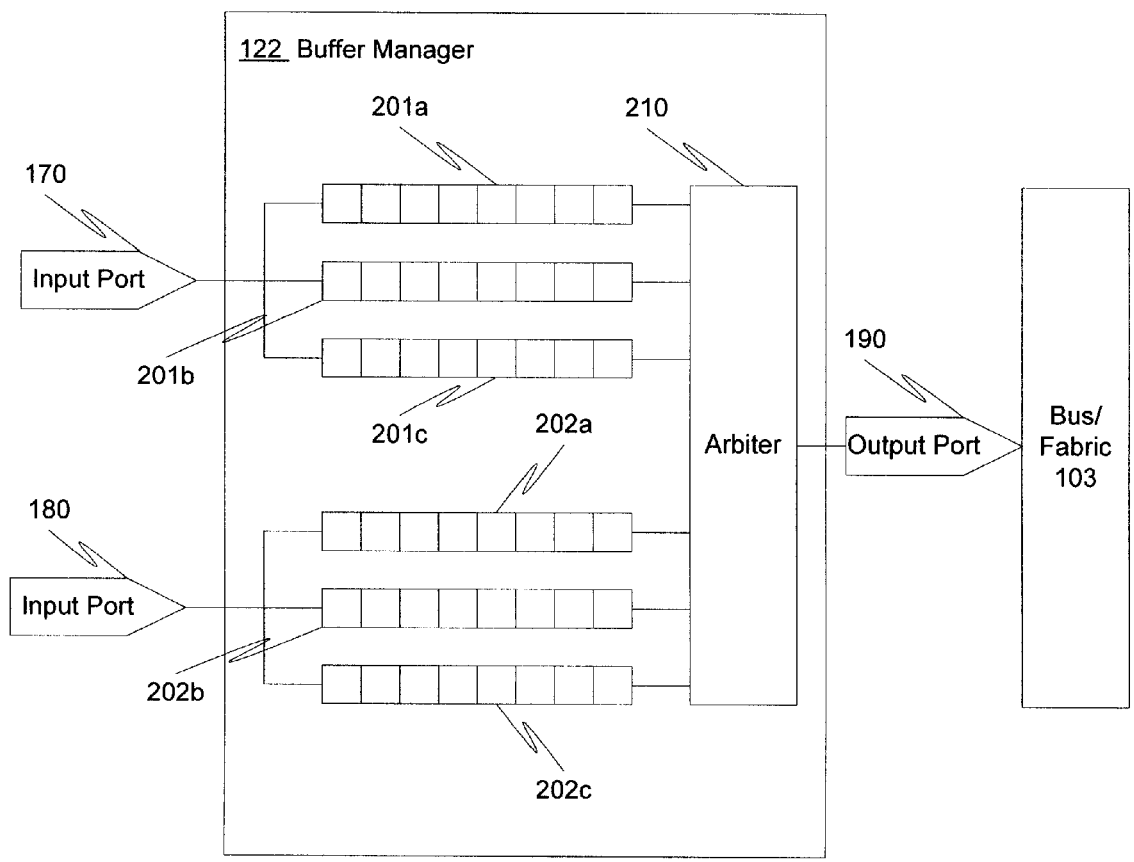
FIG. 2 illustrates a buffer manager consistent with methods and systems consistent with the present invention.

FIG. 2 illustrates a buffer manager 122 consistent with methods and systems consistent with the present invention. Buffer manager 122 comprises a plurality of queues (n*p queues) corresponding to a set of input ports (n ports), with each port having a set of queues corresponding to a packet priority level (p levels). One of ordinary skill in the art will recognize that there may be any number of queues corresponding to each port. In an exemplary embodiment consistent with the present invention, buffer manager 122 includes queues 201a, 201b and 201c allocated to input port 170 and having three priority levels respectively, and queues 202a, 202b, and 202c allocated to input port 180 and having three priority levels respectively. One of ordinary skill in the art will recognize that there may be any number of ports or priority levels. Queues 201a, 201b, 201c, 202a, 202b and 202c are allocated from memory, for example, memory 107. Because there is inherently a finite amount of memory, referred to for purposes herein as "buffer space," there is a need to balance the amount of memory used by queues 201a, 201b, 201c, 202a, 202b and 202c. During periods of high traffic within the router, it is possible to consume all of the available buffer space.

Each of the queues 201a, 201b, 201c, 202a, 202b and 202c receive packets from their respective ports, and de-queue them to the output port 190 via arbiter 210. Arbiter 210 determines which queue of queues 201a, 201b, 201c, 202a, 202b and 202c to de-queue to output port 190. Alternatively, when the buffer space cannot sustain additional packets, arbiter 210 determines from which queue of queues 201a, 201b, 201c, 202a, 202b and 202c to drop a packet. In dropping the packet, the router 101 will not process or forward the packet, thus freeing buffer space within the router. Methods and systems consistent with the present invention de-queue and drop packets fairly among the queues 201a, 201b, 201c, 202a, 202b and 202c, while considering packet priority levels.

Incoming traffic is already classified into p different priority levels supporting possible traffic requirements. For example, where p=3 there may be: 1) high priority traffic that should not be dropped if possible, 2) low-latency traffic that should be de-queued first because it is time sensitive, and 3) best effort (or low priority) traffic that should be dropped first when buffer space becomes scarce. These priority levels are indicated within the packets themselves. Those of ordinary skill in the art will understand there to be many possible bases for classification.

The arbiter 210 consistent with methods and systems consistent with the present invention receives one packet per processor cycle from one of the input ports 170 and 180, including the information specifying the packet's priority level. The arbiter 210 places the packet into the queue corresponding to the priority level for the received port. For example, where the packet was received on input port 170, the buffer manager 122 would place the packet in queue 201a if the priority level were "high priority," 201b if the priority level were "low latency," and 201c if the priority level were "best effort," in accordance with the priority levels exemplary listed above.

Figure 3:
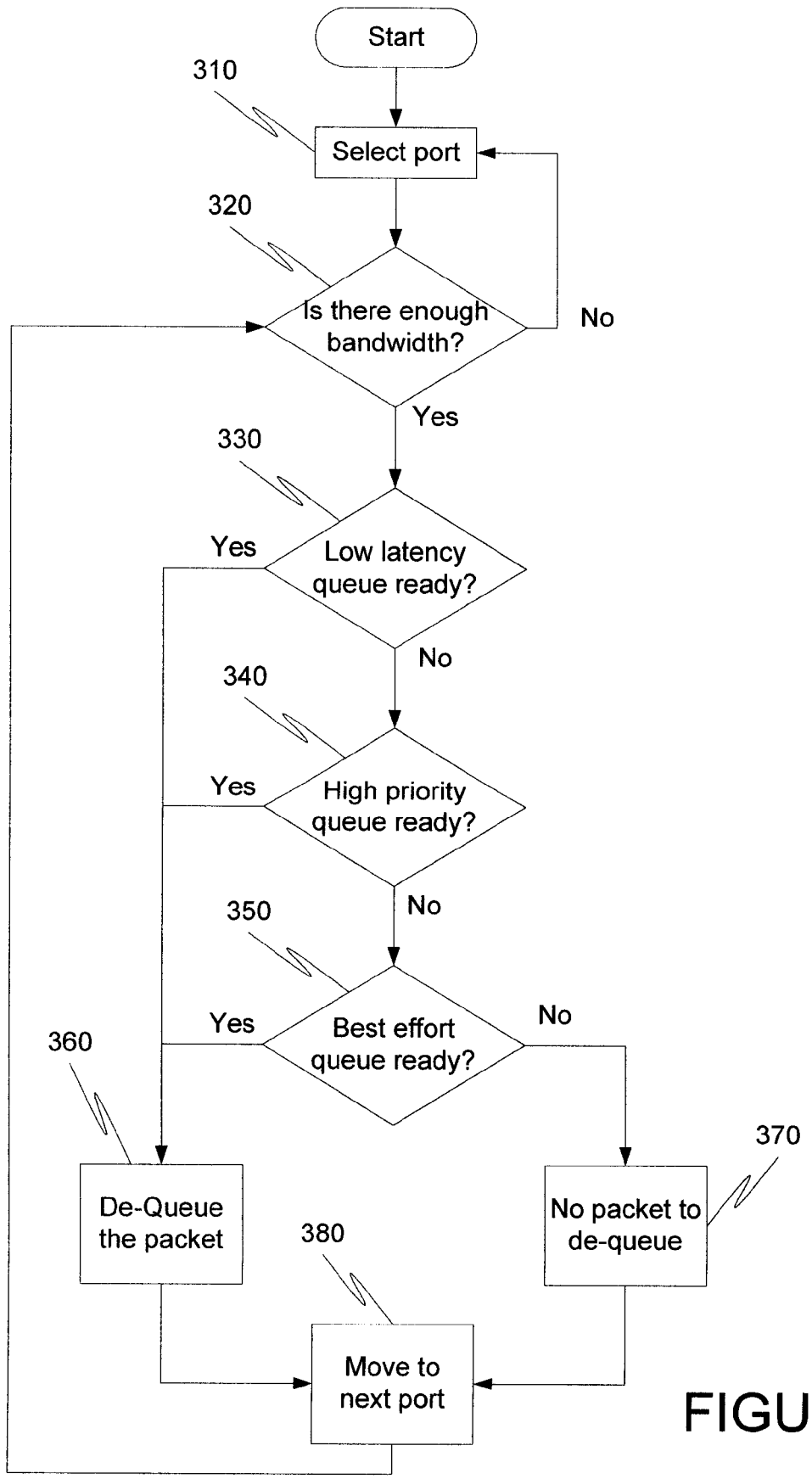
FIG. 3 illustrates a packet de-queue method consistent with methods and systems consistent with the present invention.

FIG. 3 illustrates a flow chart depicting a method for de-queuing packets consistent with methods and systems consistent with the present invention. Fair de-queuing among ports is achieved by implementing a two-level arbitration scheme. The first level is done in parallel over each of the n ports, and computes a signal specifying if any of the p priorities associated with the is has a cell available. The second level is a round-robin sequence where the arbiter 210 selects a port (step 310). If there is sufficient bandwidth to de-queue a packet (step 320), the arbiter 210 polls the queues associated with the selected port. For example, the arbiter 210 polls the queues associated with port 170. The arbiter 210 first determines if the low latency queue has a packet ready to de-queue (step 330). For example, the arbiter 210 determines if queue 201b has a packet ready to de-queue. If not, the arbiter 210 then determines if the high priority queue associated with port n has a packet ready to de-queue (step 340). For example, the arbiter 210 determines if queue 201a has a packet ready to de-queue. If not, then the arbiter 210 then determines if the best effort priority queue 201c associated with port n has a packet ready to de-queue (step 350). For example, the arbiter 210 determines if queue 201c has a packet ready to de-queue. A packet is de-queued to the output port 190 (step 360). After a packet is de-queued, or if no packets are ready to de-queue, the arbiter 210 moves to the next port in the cycle of ports (step 370) and repeats the cycle (step 310). Thus all ports will receive their weighted fair share of the output bandwidth. This scheme achieves simplicity in a hardware implementation because the arbitration is across only n ports, rather than n ports times p priority levels.

Figure 4:
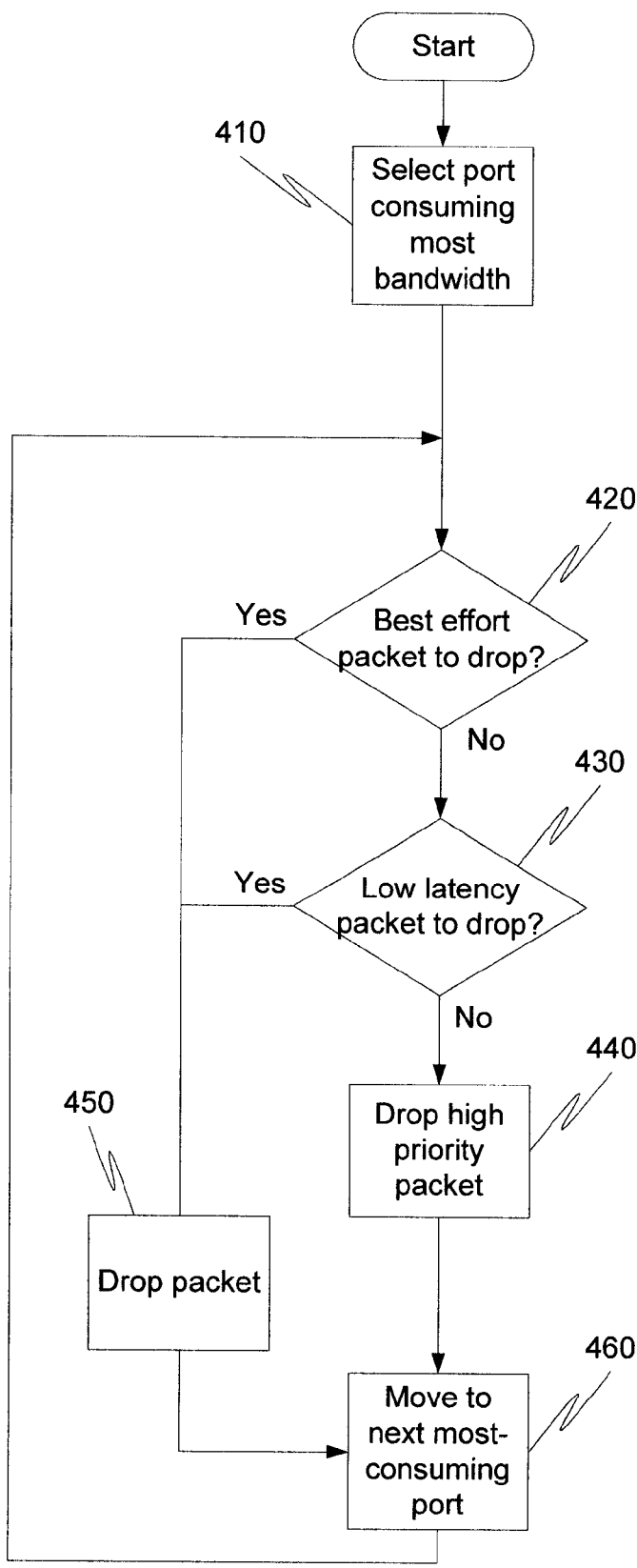
FIG. 4 illustrates a packet drop method consistent with methods and systems consistent with the present invention.

FIG. 4 illustrates a flow chart depicting a method for dropping packets consistent with methods and systems consistent with the present invention. When it is not possible to de-queue traffic because the buffer space is full or becoming full, then packets are dropped instead of de-queued. Whenever a packet is en-queued, a counter for that port is incremented by a percentage of the port's allotted output bandwidth. When a packet is de-queued or dropped, then this port's counter is decremented by the same amount. Thus, this set of n counters for n ports will maintain a weighted amount buffer usage currently consumed by each port. The arbiter 210 chooses a port from which to drop a packet based on which port's counter is the largest (step 410). For example, assume port 170 has the largest counter and is thus using the most buffer space. Once the port is selected from which to drop the packet, then the arbiter 210 determines which of the queues associated with that port should drop a packet. The arbiter 210 first determines if the best effort queue has a packet to drop (step 420). For example, the arbiter 210 determines if queue 201c has a packet to drop. If not, the arbiter 210 then determines if the low latency priority queue associated with port n has a packet to drop (step 430). For example, the arbiter 210 determines if queue 201a has a packet to drop. If not, then the arbiter 201 then drops a packet from the high priority queue (step 440). For example, the arbiter 210 drops a packer from queue 201b. Otherwise, packets are dropped at step 450. After a packet is dropped, the arbiter 210 moves to the next port consuming the most buffer space (step 460) and repeats the cycle (step 410). As illustrated, the drop priority arbitration is different from that of de-queuing. In the example, the best effort queue is picked first for dropping, then the low-latency is picked, and then the high priority is picked last. This order ensures that high priority traffic will be dropped only in the case where the offered amounted of high priority traffic exceeds the fair share of bandwidth allocated to the port.

The largest of n counters is calculated to determine which port should be selected for the drop operations. Performing this calculation in one scheduling cycle may be a difficult hardware operation as it requires at least n parallel compares. Instead, an approximate determination of the port using the largest amount of buffer resources may be implemented. Instead of n parallel compares, one compare is made per n cycles. This slight delay in determining the port using the most buffer space may result in a drop from a port that is not currently consuming then most resources. However, this port was the largest consumer a few cycles before. By picking a port that is not necessarily the absolute largest consumer of resources, the near-largest largest consumer of resources is picked while reducing the computational ability to perform the comparison.

An additional drop optimization consistent with methods and systems consistent with the present invention may be implemented. Where low latency traffic is queued for a large amount of time, this traffic may become of no value because of the time sensitive nature of the traffic. Accordingly, the drop rules should change and this traffic should be dropped before the best effort traffic is dropped. Thus, a queue length counter and a discard threshold may be included for the low latency queues. After a port has been selected from which to drop a packet, the length of the low-latency queue is examined. If the low latency queue length is above the discard threshold then the drop priority arbitration is modified such that low-latency packets are dropped first and best effort packets are dropped second, instead of dropping best effort packets first. This scheme is simple to implement in hardware as this is arbitration over only two queues.

Furthermore, the buffer manager 122 may adjust the amount of bandwidth allocated to each port. For example, if there is traffic only on one port then the entire buffer can be used by that port. If all other ports become active, then the buffer manager may balance bandwidth fairly among the ports. Within a port, high priority traffic is dropped only if it is consuming more than its fair share of bandwidth allocated to the port. The hardware is low cost and simple because it never arbitrates across n*p queues in parallel.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

What is claimed is:

1. A method for packet drop arbitration in a data processing system having a memory and a plurality of network ports including a plurality of input ports, the method including the steps of:

determining an input port from the plurality of input ports for which a packet should be dropped;

determining a queue from which to drop the packet from a plurality of queues in the memory that are associated with the input port, comprising the steps of:

determining the queue based on a priority level associated with the queue;

maintaining a queue length counter for a low latency queue; and dropping a packet from the low latency queue before dropping a packet from a low priority queue when the queue length counter exceeds a threshold; and dropping the packet from the determined queue.

2. The method of claim 1, wherein determining an input port includes determining which of the plurality of input ports is using more than an allocated percentage of the memory.

3. The method of claim 2, further including maintaining a counter for each of the plurality of input ports to determine an amount of memory used by each of the plurality of input ports.

4. The method of claim 2, including adjusting an amount of memory allocated to each of the plurality of input ports.

5. The method of claim 1, further including dropping a packet from the low priority queue before dropping a packet from any other queue.

6. The method of claim 5, further including dropping a packet from the low latency queue when there is no packet to drop from the low priority queue.

7. The method of claim 6, further including dropping a packet from a high priority queue when there is no packet to drop from the low latency queue.

8. The method of claim 1, wherein the method is performed in a router.

9. A non-transitory computer readable medium comprising computer-implemented instructions for performing a method of packet de-queue arbitration, the method including the steps of:

determining an input port from a plurality of input ports for which a packet should be de-queued;

determining a queue from which to de-queue the packet from a plurality of queues in a memory that are associated with the input port, comprising the steps of:

determining the queue based on a priority level associated with the queue; and de-queuing a packet from a low latency queue before de-queuing a packet from any other queue; and de-queuing the packet from the determined queue.

10. The non-transitory computer readable medium of claim 9, further including de-queuing a packet from a high priority queue when there is no packet to de-queue from the low latency queue.

11. The non-transitory computer readable medium of claim 10, further including de-queuing a packet from a low priority queue when there is no packet to de-queue from the high priority queue.

12. The non-transitory computer readable medium of claim 9, further including:

receiving a packet at a first input port; and en-queuing the packet in one of the plurality of queues based on a priority level associated with the packet, each queue having an associated priority level.

13. The non-transitory computer readable medium of claim 12, further including determining the priority level from the packet.

14. The non-transitory computer readable medium of claim 12, further including determining the priority level to be one of high priority, low priority, and low latency.

15. The non-transitory computer readable medium of claim 9, wherein the method is performed in a router.

16. The non-transitory computer readable medium of claim 9, further including defining, by branch table mapping, a branch code to a branch function entry.

17. A data processing system comprising:

a router having a memory, at least one output port, and a plurality of input ports;

a plurality of queues stored in the memory, wherein there are at least two queues associated with each of the plurality of input ports; and a queue arbiter for de-queuing a packet from one of the plurality of queues to the output port, wherein a first level of arbitration is based on a selection of an input port and a second level of arbitration is based on a priority of the at least two queues associated with the input port, wherein a packet from a low latency queue is dropped before a packet from a low priority queue is dropped when a queue length counter exceeds a threshold.

* * * * *